United States Patent [19]
Essig et al.

[11] Patent Number: 5,979,968
[45] Date of Patent: Nov. 9, 1999

[54] REMOVABLE RETAINER ARRANGEMENTS FOR FLEXIBLE, VEHICLE TOPS

[75] Inventors: Richard C. Essig, Berthoud, Colo.;
Keijo J. Huotari, Woodhaven, Mich.;
Rick H. Troeger, Westminster, Colo.

[73] Assignee: Bestop, Inc., Broomfield, Colo.

[21] Appl. No.: 09/052,740

[22] Filed: Mar. 31, 1998

Related U.S. Application Data

[60] Division of application No. 08/646,486, May 8, 1996, Pat. No. 5,765,903, which is a continuation-in-part of application No. 08/437,322, May 9, 1995, Pat. No. 5,702,147.

[51] Int. Cl.⁶ ...................................................... B60J 7/08
[52] U.S. Cl. .............................. 296/102; 52/222; 160/327
[58] Field of Search ........................... 296/100.15–100.18, 296/102; 135/119; 52/222; 40/603; 160/382, 392, 395, 327, 403, 404; 24/587, 6.4, 618, 662

[56] References Cited

U.S. PATENT DOCUMENTS

| | | |
|---|---|---|
| 3,177,501 | 4/1965 | Kwake . |
| 3,186,712 | 6/1965 | Kessler . |
| 3,354,473 | 11/1967 | Schwarz et al. ..................... 160/395 |
| 3,405,489 | 10/1968 | Frisk ..................................... 52/222 |
| 4,757,854 | 7/1988 | Rippberger ........................... 160/391 |
| 4,792,179 | 12/1988 | Stevens ............................. 160/327 X |
| 5,029,422 | 7/1991 | Scherrer . |

FOREIGN PATENT DOCUMENTS

| | | | |
|---|---|---|---|
| 464490 | 12/1968 | Switzerland ......................... 52/222 |
| 1214421 | 12/1970 | United Kingdom ................. 52/222 |

*Primary Examiner*—Dennis H. Pedder
*Attorney, Agent, or Firm*—W. Scott Carson

[57] ABSTRACT

Retainer arrangements for removably attaching flexible tops to sport utility, convertible, and other vehicles. The arrangements include a belt or flange which is sewn or otherwise attached to the flexible top and a U-shaped channel which is formed on the vehicle body. In the preferred embodiments, the belt or flange is received in the U-shaped channel and a mating protuberance and recess arrangement is provided to removably lock the flange in the channel.

10 Claims, 7 Drawing Sheets

REMOVABLE RETAINER ARRANGEMENTS FOR FLEXIBLE, VEHICLE TOPS

RELATED APPLICATIONS

This application is a division of U.S. patent application Ser. No. 08/646,486 filed May 8, 1996, now U.S. Pat. No. 5,765,903, which is a continuation-in-part of U.S. patent application Ser. No. 08/437,322 filed May 9, 1995, now U.S. Pat. No. 5,702,147.

BACKGROUND OF THE INVENTION

1. Field of the Invention.

This invention relates to the field of retainer arrangements for removably attaching flexible tops to vehicle bodies.

2. Discussion of the Background.

Providing effective retainer arrangements for attaching tops to vehicle bodies has always presented challenging design problems. These problems are particularly prevalent in sport utility, convertible, and other vehicles which have flexible tops of fabric-like material such as canvas or vinyl which are removable for an open air feeling or service. Co-owned U.S. Pat. No. 4,757,854 taught a very effective approach to accomplish this in which a belt or flange was attached to the edge of the flexible, fabric top and inserted into a U-shaped channel mounted on the vehicle body. In doing so, the flexible top was first pulled taut and stretched a half inch or so. This placed the resilient top under a slight tension as the belt was manually manipulated into the channel; and, the resulting tension was then used to maintain the belt with the attached top in the channel. The present invention is an improvement over this basic design.

SUMMARY OF THE INVENTION

This invention involves retainer arrangements for removably attaching flexible tops to sport utility, convertible, and other vehicles. The arrangements include a belt or flange which is sewn or otherwise attached to the flexible top and a U-shaped channel which is formed on the vehicle body. In the preferred embodiments, the belt or flange is received in the U-shaped channel and a mating protuberance and recess arrangement is provided to removably lock the flange in the channel.

In one approach, the flange with the flexible top attached to it is manually manipulated to slide into the U-shaped channel. In doing so, the flexible top is stretched slightly and placed under tension. Upon releasing the inserted flange, the resilient force of the stretched top causes the flange to rotate or cock relative to the U-shaped channel which then firmly mates the protuberance and recess of the locking arrangement. In a second approach, an initial interference fit is provided between the flange and U-shaped channel. The flange is then moved relative to the channel past the interference fit and rotated as in the first approach under the residual force of the stretched top to firmly mate the protuberance and recess in their locked position. However, unlike the first approach, the flange and channel will thereafter remain engaged because of the interference fit regardless of whether there is any residual force or tension applied to the flange by the flexible top. In a third approach, the flange and channel are also designed to remain attached to one another regardless of whether there is any residual tension applied to the flange by the flexible top. However, unlike the second approach, the flange and channel do not rely on any residual force in the top to assume their locked position. In all embodiments, the insertion process of the flange into the channel can be reversed when desired to remove the flange and attached top from the U-shaped channel and vehicle body.

DETAILED DESCRIPTION OF THE PREFERRED EMBODIMENTS

Figures 1, 2, 3, 4:
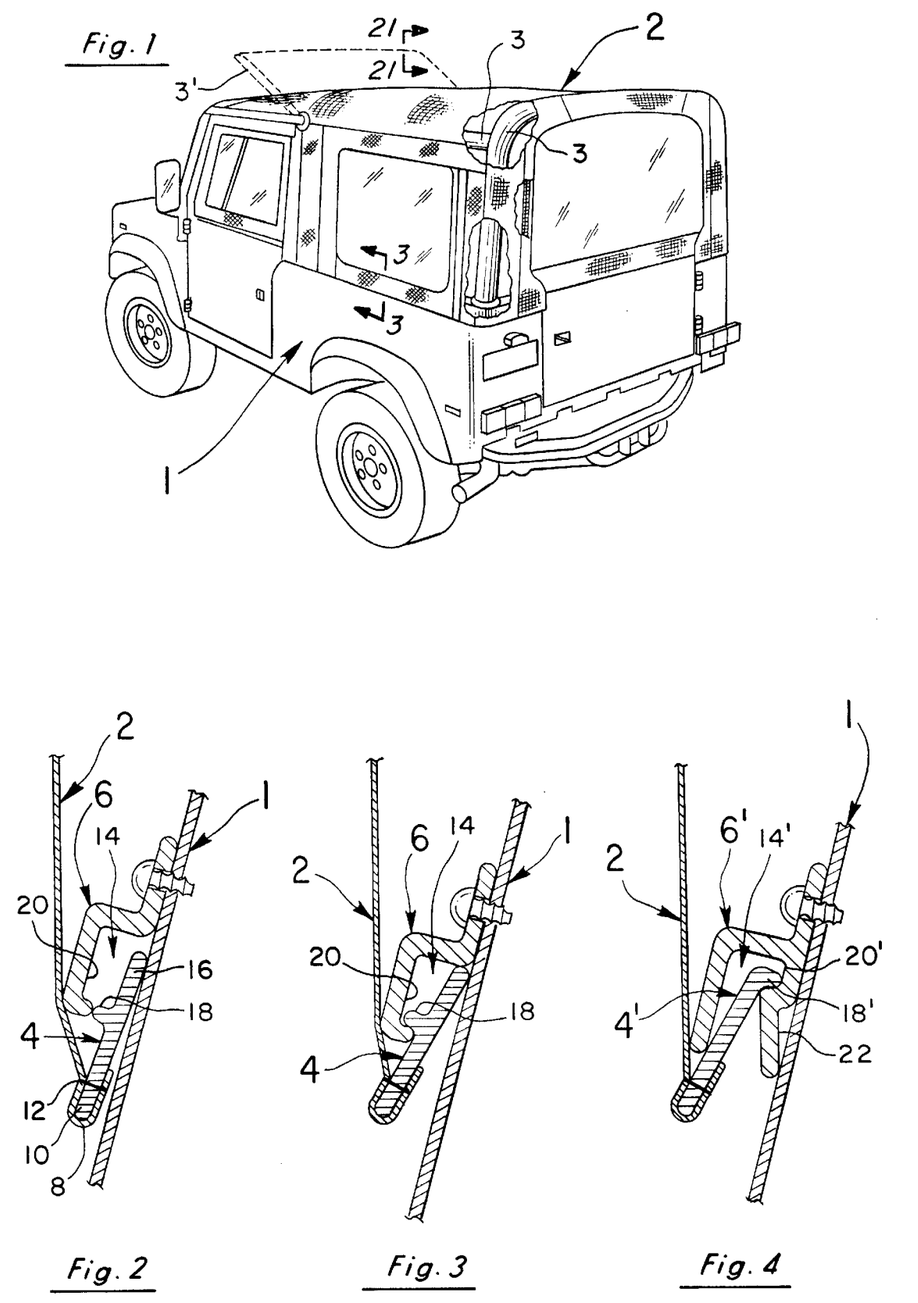
FIG. 1 is a rear perspective view of a vehicle employing one of the retainer arrangements of the present invention. The flexible top in FIG. 1 is also partially broken away to show the underlying bow structure on which the top is supported.
FIG. 2 is a cross-sectional view of one of the retaining arrangements of the invention showing the positioning of the belt or flange as it is being initially inserted into the U-shaped channel mounted on the vehicle body.
FIG. 3 is a cross-sectional view taken along line 3—3 of FIG. 1 illustrating the fully inserted flange of FIG. 2 and how it is held in place in its locked position by the tensioned top.
FIG. 4 is a view similar to FIG. 3 of a modification to the retaining arrangement of FIGS. 2 and 3.

FIG. 1 illustrates the top retaining system of the present invention in use on a sport utility vehicle 1. The top 2 as illustrated is partially broken away in the rear to show the underlying bow structure 3 on which the flexible top 2 is supported. The top 2 itself is made of canvas, vinyl, or similar fabric-like material and is slightly stretchable and resilient. In use, the flexible top 2 can be draped over the bows 3 or other support frame of the vehicle 1 and pulled taut to stretch a half inch or so. This places the top 2 under a slight tension and the resulting force of such tension is used in the first approach of FIGS. 2–4 to hold the top 2 on the vehicle body 1. In the embodiment of FIGS. 2–3, this is done by the retaining arrangement of belt 4 and channel member 6. Similarly, in the embodiment of FIG. 4, this retaining is accomplished by the modified belt 4' and channel member 6'.

First Approach Of FIGS. 2–4

Referring initially to the embodiment of FIGS. 2–3, the flexible top 2 can be attached to the retaining belt or flange 4 in any number of ways. As shown in FIG. 2, this can be done by simply wrapping the end or edge portion 8 of the top 2 about the first end portion 10 of the flange 4 and sewing a line at 12 through the fabric top 2 and flange 4. A U-shaped channel 14 is then formed by mounting channel member 6 to the side of the vehicle 1. In operation as illustrated in FIG. 2, the second end portion 16 of the flattened or elongated flange 4 is initially inserted into the U-shaped channel 14 formed by channel member 6. This manual manipulation of the flange 4 stretches and pulls the flexible top 2 taut placing it under tension. As the flange 4 is fully inserted into the U-shaped channel 14 and released (see FIG. 3), the residual tension or force of the stretched, resilient top 2 causes the flange 4 to rotate or cock relative to the channel forming member 6. This rotation firmly engages the mating protuberance 18 and recess 20 to positively lock the flange 4 in the U-shaped channel 14 under the residual tension of the top 2. As shown, the second end portion 16 of the flange 4 in this position is fully received in the U-shaped channel 14 while the axially spaced first end portion 10 remains substantially outside the U-shaped channel 14. In a variation of this first embodiment as shown in FIG. 4, the recess 20' is adjacent the vehicle body 1 in a leg 22 of the channel forming member 6'. The protuberance 18' extending outwardly on the flange 4' then locks into the mating recess 20' to retain the top 2 on the vehicle body 1.

As illustrated, both of the embodiments of FIGS. 2–4 rely on the residual tension in the top 2 to hold the flanges 4 and 4' in the locked positions of FIGS. 3 and 4. Further, both embodiments of FIGS. 2–4 rely on there being some residual tension in the flexible top 2 to keep the flanges 4 and 4' engaged in channel members 6 and 6'. That is, the legs of the U-shaped channel are spaced a first distance apart that is greater than the thickness of the flange. Consequently, for example, if the top 2 in FIGS. 2–4 were to lose all or even some of its residual tension, it is possible that the flanges 4 and 4' may disengage and move completely out of their retaining channel members 6 and 6'.

Second Approach Of FIGS. 5–10

Figure 6:
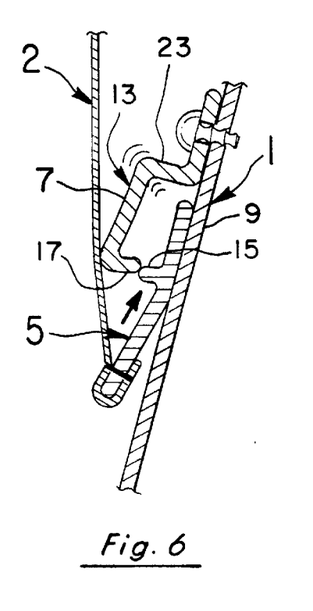
Figure 6A:
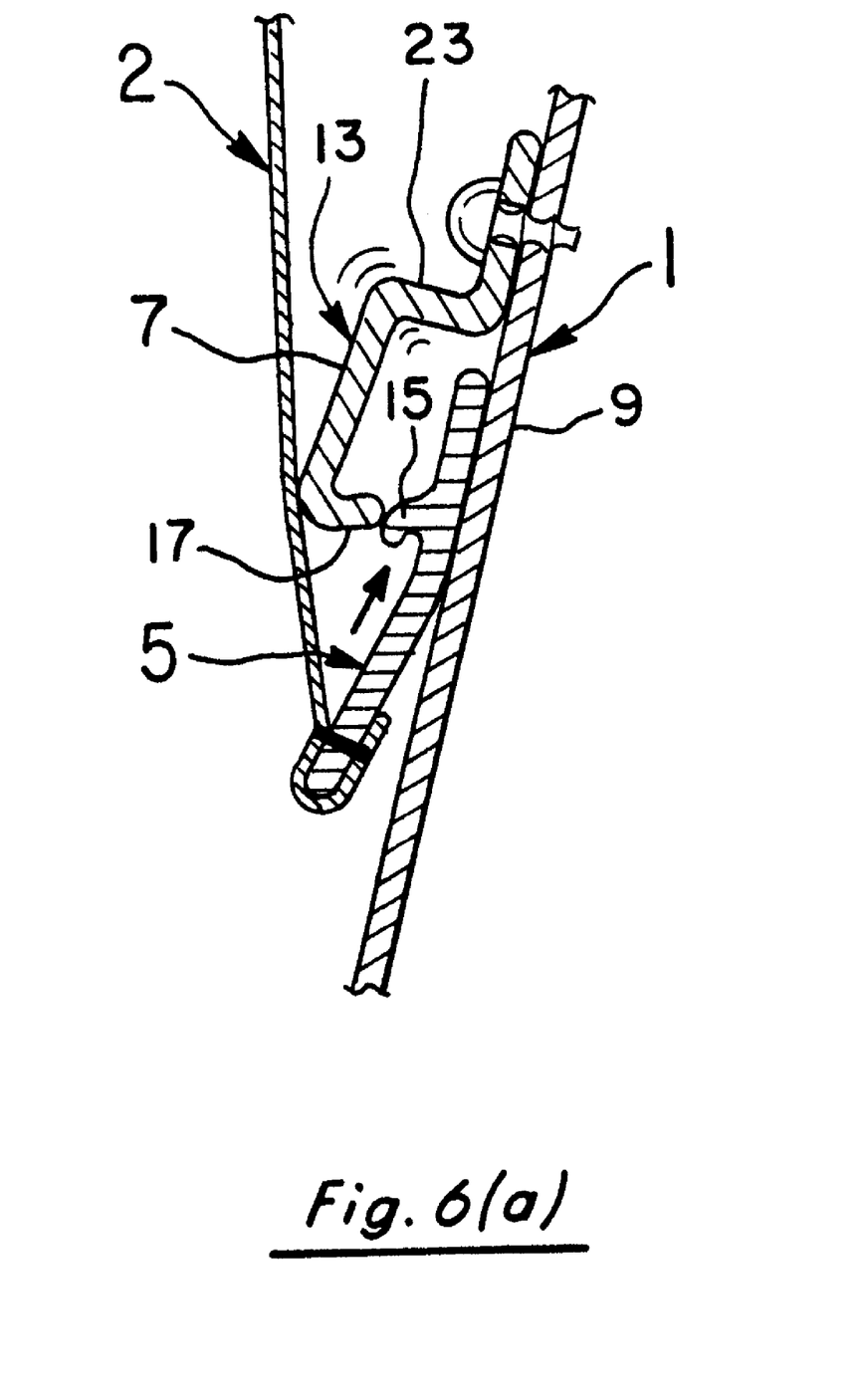
FIG. 6(a) in particular shows the operation of an embodiment in which both the flange and channel are made of resilient, flexible material and both members flex to pass the flange into the channel.
Figure 7:
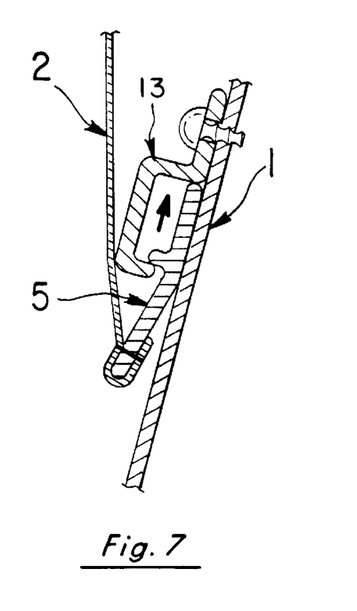
Figures 8, 9, 10:
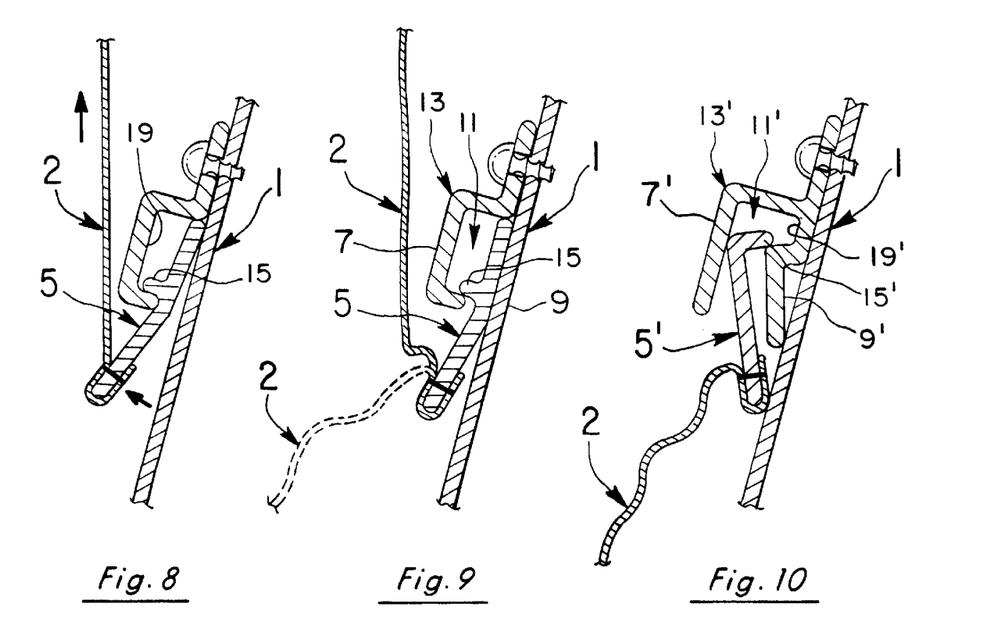

In contrast the first approach of FIGS. 3 and 4 which relies on the residual tension of the top 2 to always hold or maintain the flanges 4 and 4' engaged in the channel members 6 and 6', the embodiments of the second approach of FIGS. 5–10 provide an interference fit to do so. That is and referring to the embodiment of FIGS. 5–9, there is an interference fit between the flange 5 and legs 7 and 9 of the U-shaped channel 11. This U-shaped channel 11 as shown is formed by mounting the channel member 13 to the vehicle body 1. In this embodiment, the interference fit is between the protuberance 15 extending outwardly on the flange 5 and the portion 17 on the leg 7. The portion 17 as shown defines in part the inwardly extending recess 19. In operation as the second end portion 21 of the flange 5 is initially received and inserted into the U-shaped channel 11 to the first position of FIG. 5, the protuberance 15 and leg 7 will thus abut. This will occur because the thickness of the flange 5 at this point is greater than the spacing between the legs 7 and 9 of the U-shaped channel 11. Consequently, as the flange 5 is inserted farther into the channel 11, either or both (see FIG. 6) of the flange 5 and the channel member 13 must resiliently flex in order for the abutting portions 15 and 17 to pass one another. The vehicle body 1 in this embodiment forms one of the legs (i.e., leg 9) of the U-shape. This leg 9 and the corresponding legs like 9' in FIG. 10 are essentially held in a fixed position and preferably do not flex. Nevertheless, the necessary flexing could be in almost any of the other portions or members including in the entire flange 5 or just the protuberance 15 on it. It could also additionally be in the base 23 of the U-shape and/or in the leg 7 (or just in the protruding portion 17 of leg 7). Regardless of which portions or members flex, the flange 5 can be manually maneuvered to the second position of FIG. 7.

Thereafter and like the first approach of FIGS. 2–4, the residual tension in the top 2 will then rotate or cock the flange 5 from the engaging, second position of FIG. 7 to the locked, third position of FIG. 8 in which the protuberance 15 is fully mated in the recess 19. However, unlike the first approach of FIGS. 2–4, the interference retaining arrangement of FIGS. 5–9 will maintain the flange 5 engaged in the channel 11 even when there is no residual tension on the flexible top 2 (see FIG. 9). The interference retaining arrangement of FIGS. 5–9 as compared to the arrangements of FIGS. 2–4 is thus not dependent on any residual tension in the flexible top 2 to remain engaged.

Figure 5:
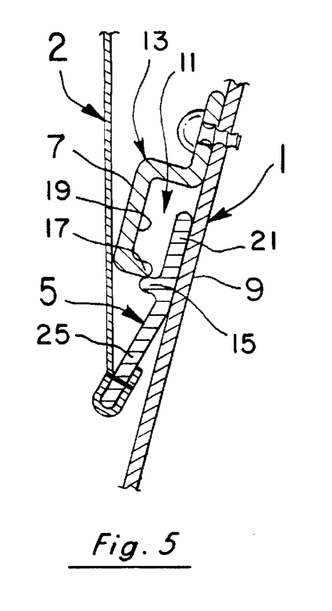
FIGS. 5–10 illustrate a second approach to retaining the flange in the U-shaped channel. In this second approach, an interference fit is provided between the flange and channel. In contrast to the first approach of FIGS. 2–4, the flange and channel of FIGS. 5–10 will remain engaged regardless of whether there is any residual tension applied to the flange by the flexible top. However, like the approach of FIGS. 2–4, residual tension in the top is still relied on to rotate the flange into its locked position.

In many applications, this can be an important feature. For example, it is not uncommon for the top 2 to be exposed to high temperatures and lose its residual tension as shown in solid lines in FIG. 9. This may also simply occur with age. Regardless of how this residual tension is lost (e.g., heat, age, or even if the top 2 is partially removed to the position shown in dotted lines in FIG. 9), the interference fit between the protuberance 15 and the legs 7 and 9 of channel 11 in FIG. 9 will hold the flange 5 and attached top 2 engaged in the channel 11 until the manual insertion steps of FIGS. 5 and 6 are reversed. Consequently, the flange 5 will not inadvertently separate from the channel 11 should the top 2 become heated or otherwise loosen to the position shown in solid or dotted lines in FIG. 9. In contrast and should the top 2 in the embodiments of FIGS. 2–4 lose all or even some of its residual tension, it is possible that the locking arrangement of FIGS. 3 and 4 may disengage and the flanges 4 and 4' move completely out of their retaining channels 6 and 6'.

FIG. 10 illustrates a similar modification to the embodiment of FIG. 4 to provide an interference fit between the protuberance 15' on the flange 5' and the legs 7' and 9' of the channel 11'. In one design of FIG. 10, the channel forming member 13' is made of relatively rigid material and only the flange 5' is made of resilient, flexible material and flexes. However, as in the embodiment of FIGS. 5–9, either or both of the flange 5' and the channel forming member 13' could flex to allow the flange 5' to pass by the interference fit to the engaged position of FIG. 10. The protuberance 15' in FIG. 10 is also substantially at the terminus of the flange 5' as opposed to being substantially in the middle between the axially spaced end positions 21 and 25 of the flange 5 in FIGS. 5–9.

Third Approach Of FIGS. 11–21

The embodiments of FIGS. 11–14, 15–17, and 18–21 like of the second approach of FIGS. 5–10 provide an initial interference fit between the flange and U-shaped channel and do not rely on any residual tension in the top 2 to keep the flange and channel member attached. However, unlike the designs of FIGS. 5–10, the arrangements of FIGS. 11–21 provide structure wherein the belts or flanges 30, 30', and 30" will not only stay attached if all residual tension is removed from the top 2 but also will stay attached in their mating, locked positions under such conditions.

Figure 11:
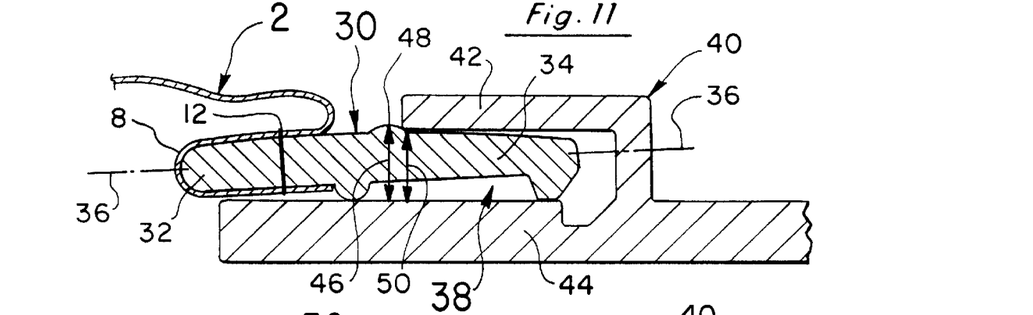
FIGS. 11–21 illustrate a third approach to retaining the flange in the U-shaped channel. In this third approach, the flange and channel do not rely on any residual force in the top to assume their locked position. Additionally, the flange and channel remain attached to one another in their locked position regardless of whether there is any residual tension applied to the flange by the flexible top. In the sequence drawings of FIGS. 11–14, an embodiment is illustrated in which the channel is made of relatively rigid material and the flange flexes. In the sequence drawings of FIGS. 15–17, the flange is made of relatively rigid material and the U-shaped channel member flexes. In the sequence drawings of FIGS. 18–21, the flange and channel are both made of resilient material and flex.

Referring first to the embodiment of FIGS. 11–14, the belt or flange 30 like flanges 5 and 5' of FIGS. 5–7 has a flattened or elongated width with first and second end portions 32 and 34 spaced from each other along a first axis 36. Similarly, the end or edge portion 8 of the top 2 is wrapped around the first end portion 32 and attached thereto by a sew line at 12 through the fabric top 2 and flange 30. The U-shaped channel 38 in FIG. 11 is then formed by channel member 40. Member 40 is shown as an h-shaped member similar to 6' in FIG. 4 but the U-shaped channel for all of the embodiments of this invention could be made or molded directly into the vehicle body 1 or formed by a member like 6 in FIG. 2 that uses the vehicle body 1 as one of the legs of the U-shape. The intent in each case is to make the U-shaped channel essentially an integral part of the vehicle body 1. The roles of the flange and channel could be reversed if desired with the flange mounted on the vehicle body and the channel on the top but the illustrated versions with the channel formed on the vehicle body are preferred.

In the embodiment of FIGS. 11–14, the second end portion 34 of the flange 30 is first inserted manually into the U-shaped channel 38 to the first position of FIG. 11. At this position, there is an interference fit between the flange 30 and the legs 42 and 44 of the U-shaped channel 38. This occurs because the height or effective thickness 46 of the flange 30 at bump 48 in FIG. 11 is greater than the spacing 50 between the legs 42 and 44 of the U-shaped channel 38. Consequently, as the flange 30 is inserted farther into the U-shaped channel 38 to the second position of FIG. 12, one or both of the flange 30 and channel member 40 must flex to allow this to occur. In the embodiment of FIGS. 11–14, the channel member 40 is preferably made of relatively rigid material (e.g., metal) and does not flex and the flange 30 is preferably made of resilient, flexible material (e.g., polypropylene) and does the flexing.

Figure 12:
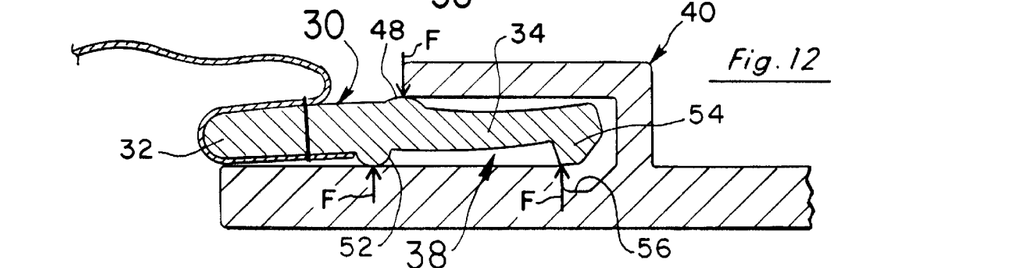

In the second position of FIG. 12, there is essentially a three point application of opposing forces F at bumps 48 and 52 and the protuberance 54. This causes the second end portion 34 of the flange 30 to flex or sway as shown in FIG. 12 with the protuberance 54 spaced from attachment or engagement with the recess 56. At this point, the second end portion 34 of the flange 30 is in a cocked or loaded state which is then released as the flange 30 is moved past the second position of FIG. 12. Upon such release, the flexed second end portion 34 of the flange 30 is rotated relative to the U-shaped channel 38, to drive the protuberance into the third position of FIG. 13. In this third position of FIG. 13, the protuberance 54 attaches and mates in the recess 56 to lock the flange 30 in the channel member 40. The protuberance 54 as illustrated is substantially at the terminus of the second end portion 34 of the flange 30 and extends outwardly of the first axis 36. Additionally, the flexible flange 30 is shown to assume a first, unflexed shape in the first position of FIG. 11 and then a second, different or flexed shape in FIG. 12. Upon reaching the third, locked position of FIG. 13, the flange 30 again substantially assumes the first shape of FIG. 11. It is also noted that as the flange 30 is inserted into the U-shaped channel 38 from the first position of FIG. 11 to the second position of FIG. 12, the interference fit continues to apply force to continually flex the second end portion 34 of the flange 30. Further, this continually applied force continually increases as the flange 30 is moved from the first position of FIG. 11 to the second, cocked position of FIG. 12.

Figure 13:
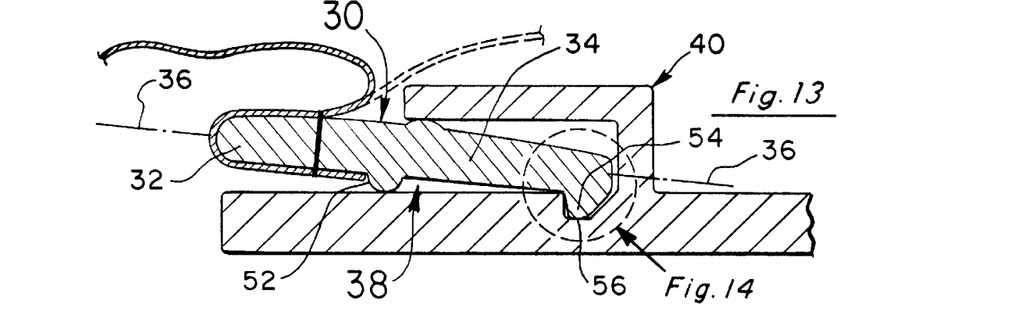
Figure 14:
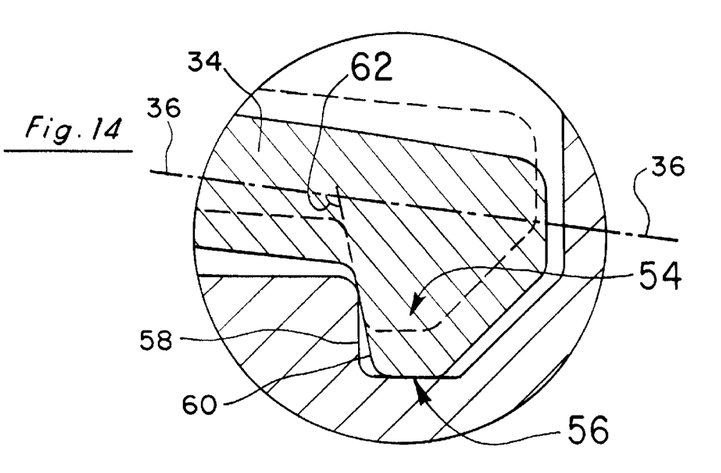

Once this force is released as the flange 30 is manually moved beyond the second position of FIG. 12, the protuberance 54 and recess 56 will then attach and mate in the position of FIG. 13. To assist this movement, the surface 58 partially defining the recess 56 (see FIG. 14) and the surface 60 of the protuberance 54 are preferably inclined to one another. This essentially creates a ramping or wedging effect to assist the insertion of the protuberance 54 into the recess 56. More importantly and when at least one of the surfaces 58 and 60 is at an angle 62 greater than 90° to the axis 36 in FIG. 14, it will assist in the disengagement and withdrawal of the protuberance 54 from the recess 56. That is, to cause the protuberance 54 to disengage from the locked position of FIG. 13, a withdrawal force is manually applied to the flange 30. This withdrawal force preferably has at least a component applied substantially along the axis 36 in a direction from the second end portion 34 of the flange 30 to the first end portion 32 thereof. Upon the application of such a withdrawal force, the inclined, abutting surfaces 58 and 60 will create a ramp effect lifting the protuberance 54 out of the recess 56 (see the dotted lines in FIG. 14) to the second position of FIG. 12.

Any downward component of the withdrawal force on the first end portion 32 of the flange 30 in a direction perpendicular to the axis 36 will also assist this disengagement and lifting. In this regard, any such downwardly applied force will slightly flex or sway the end portion 34. This will then facilitate the withdrawal by accentuating the angle between the inclined surfaces 58 and 60. In this manner, the flange 30 for the most part can be manually removed when desired from locked engagement with the U-shaped channel 38 by simply reversing the insertion steps of FIGS. 11–13.

It is also noted that depending on the flexibility of the second end portion 34 of the flange 30, it may not even be necessary to so incline the surfaces 58 and 60 to each other and/or the axis 36 in the locked position of FIG. 13. More specifically, the surfaces 58 and 60 may even be flush with each other in FIG. 13 and perpendicular to the axis 36. The downward force component on the first end portion 32 may then rock or pivot the flange 30 about bump 52 enough to flex or sway the second end portion 34 to the dotted position of FIG. 14. This would then create the desirable angle or incline between the surfaces 58 and 60 to assist disengagement.

Figure 15:
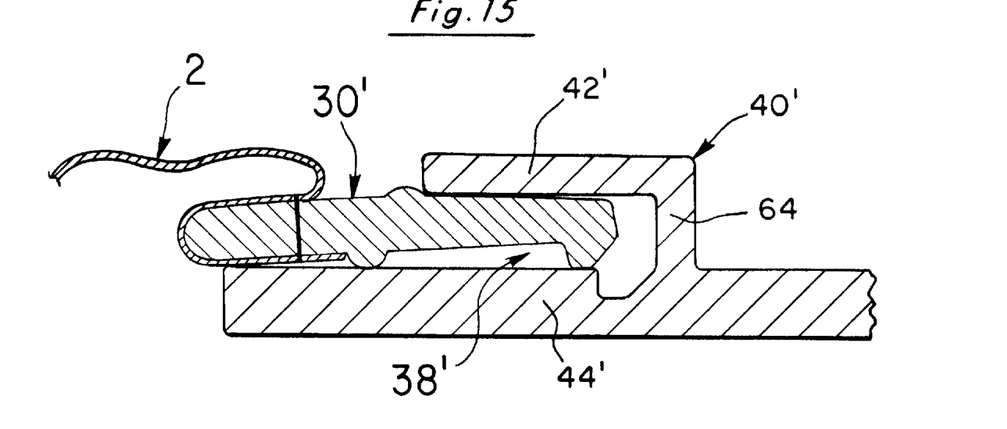
Figure 16:
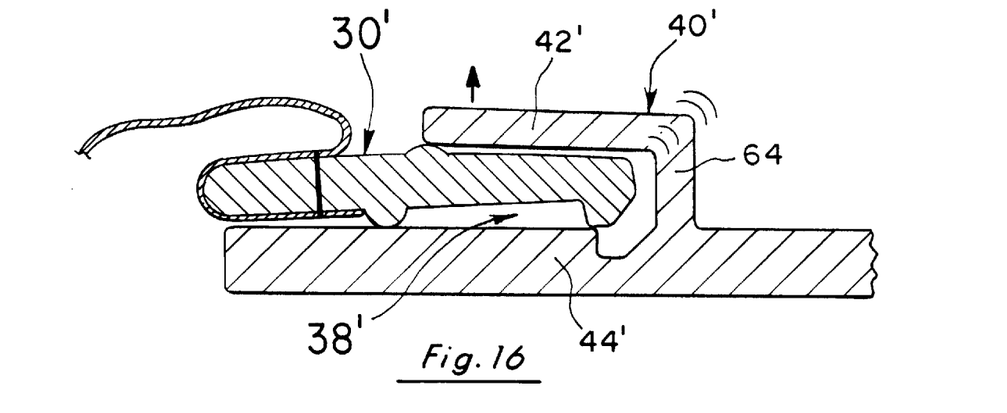
Figure 17:
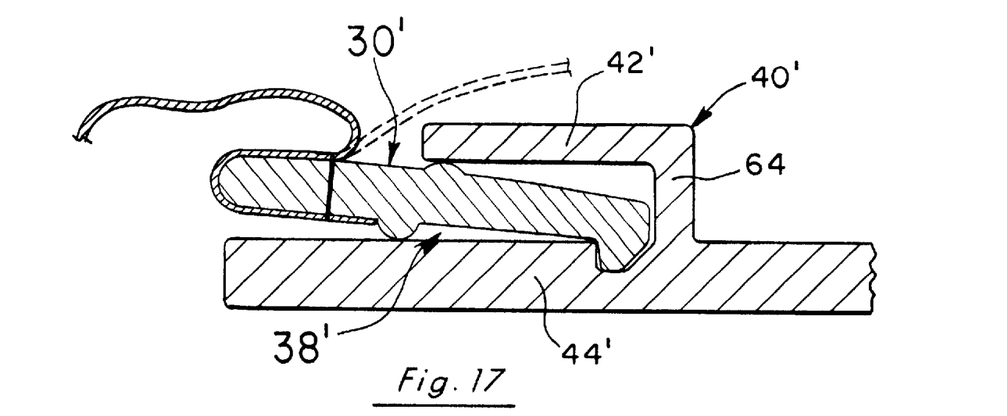

FIGS. 15–17 illustrate another embodiment in which the flange 30' is made of relatively rigid material and preferably does not flex. Additionally, at least the leg 42' and/or base 64 of the U-shaped channel member 40' extending between legs 42' and 44' is preferably made of the resilient, flexible material and does the flexing. Otherwise, the operation of the embodiment of FIGS. 15–17 is essentially the same as that of FIGS. 11–14.

Figure 18:
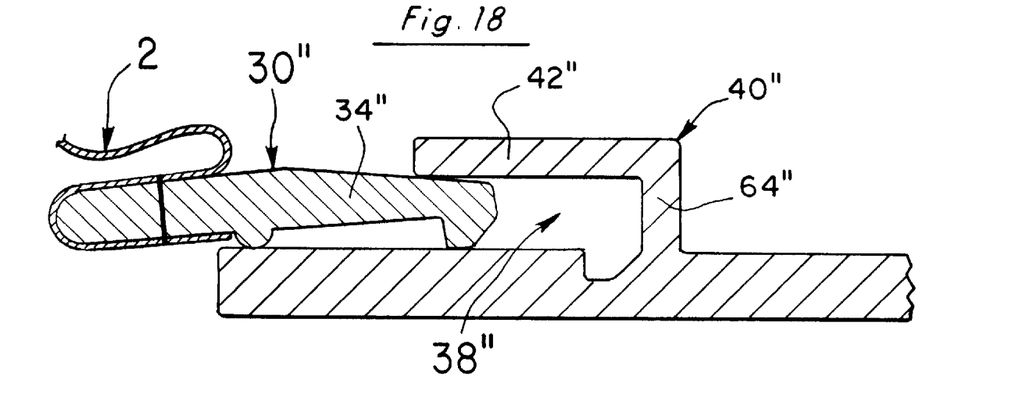
Figure 19:
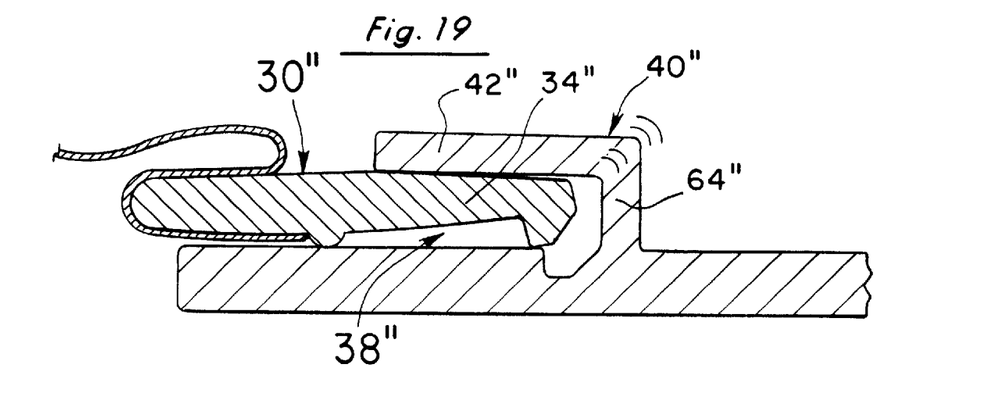
Figure 20:
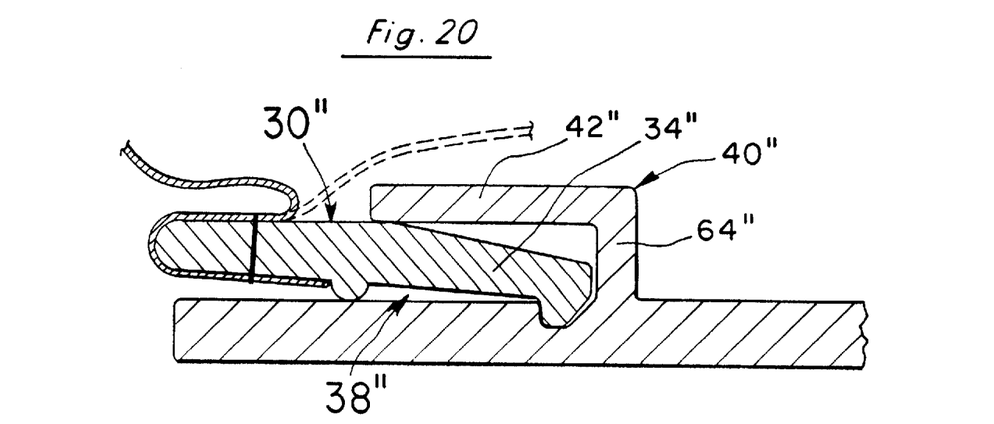

Similarly, the embodiment of FIGS. 18–20 is substantially the same as those of FIGS. 11–14 and 15–17 except that both the flange 30" at its second end portion 34" and the U-shaped channel member 40" are made of resilient, flexible material and flex as the flange 30" is inserted into the U-shaped channel 38".

Figure 21:
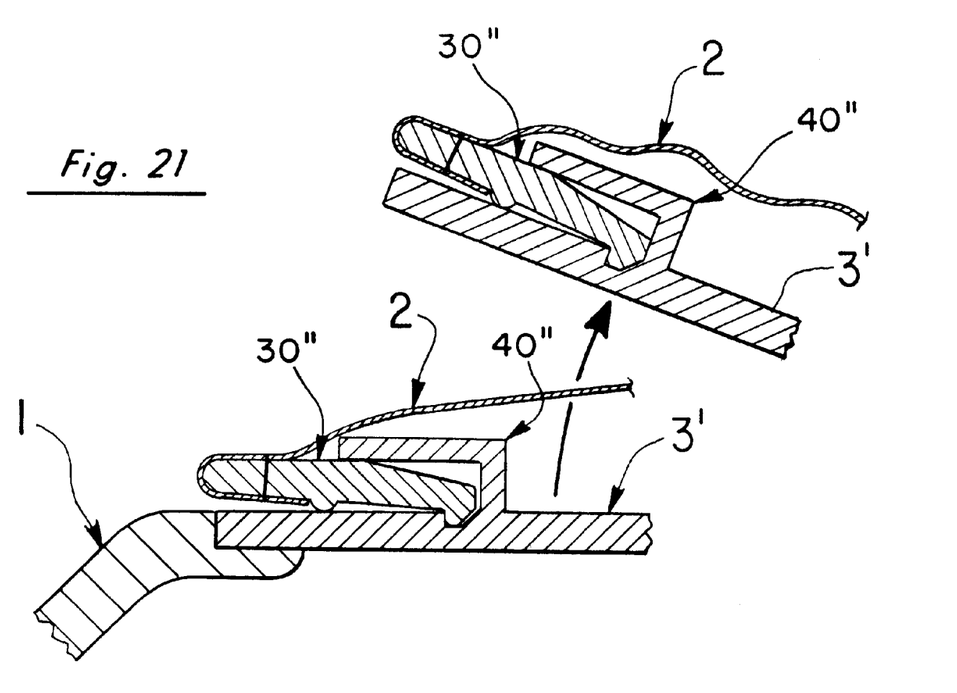

FIG. 21 is a view taken along line 21—21 of FIG. 1 and illustrates the fundamental advantage of all of the designs of FIGS. 5–20. That is, the flange (30" in the case of FIG. 21) will stay in the channel member (40") regardless of whether there is any residual tension applied to the flange by the top 2. As discussed above, heated or aged tops 2 may simply lose such tension. Also, as illustrated in FIGS. 1 and 21, it is becoming increasingly popular to have bow or supporting structure such as 3' in FIGS. 1 and 21 that pivots or folds back on itself. This pivoting or folding can be either completely or only partially as in FIG. 1 to form an opening over the passenger cockpit of the vehicle 1. Whether the bow structure of the vehicle body 1 and flexible top 2 are folded completely back on themselves for storage or only partially so, it will almost always release any tension in the flexible top 2. However, with any of the designs of FIGS. 5–21, the flange will still be maintained in the channel and the top 2 will thus remain attached to the portion of the vehicle body 1 where the channel is mounted.

While several embodiments of the present invention have been shown and described in detail, it is to be understood that various changes and modifications could be made without departing from the scope of the invention.

We claim:

1. A retaining arrangement for removably attaching a flexible, stretchable, resilient top to a vehicle body, said retaining arrangement including:

means for forming a U-shaped channel means adjacent said vehicle body, said U-shaped channel means having two legs and a base extending therebetween;

a flange with an elongated width having first and second end portions spaced from each other along a first direction, means for attaching said flexible top to said flange, said second end portion of said flange being receivable in said U-shaped channel means between the legs thereof, and means for removably locking said second end portion of said flange in said U-shaped channel means, said locking means including a mating protuberance and recess, said protuberance extending outwardly on said flange in a second direction substantially perpendicular to said first direction from a location on said flange substantially midway between said first and second end portions thereof and said mating recess extending inwardly of said U-shaped channel means wherein the legs of said U-shaped channel means are spaced apart a first distance and the flange has an effective thickness greater than said first distance creating an interference fit when said second end portion of said flange is initially inserted into said U-shaped channel means to a first position, at least one of said flange and said U-shaped channel means being made of resilient, flexible material wherein said at least one of said flange and said U-shaped channel means flexes to allow the flange to pass by said interference fit at said first position to a second, engaged position with said protuberance at least partially received and engaged in said recess, and means for rotating said flange about said U-shaped channel means from said second position to a predetermined third, locked position relative to said U-shaped channel means to mate the protuberance in said recess to lock said flange in said U-shaped channel means.

2. The retaining arrangement of claim 1 wherein said U-shaped channel means is made of relatively rigid material and only said flange is made of said resilient, flexible material and flexes to allow said flange to pass by said interference fit at said first position to said second position with said protuberance received in said recess.

3. The retaining arrangement of claim 1 wherein said channel forming means forms one of said legs of said U-shaped channel means in a fixed position relative to said vehicle body and wherein at least the other of said legs is made of said resilient, flexible material and flexes to allow said flange to pass by said interference fit at said first position to said second position with said protuberance received in said recess.

4. The retaining arrangement of claim 3 wherein said flange is made of relatively rigid material and only said U-shaped channel means flexes.

5. The retaining arrangement of claim 3 wherein said one leg of said U-shaped channel means is a portion of the vehicle body.

6. The retaining arrangement of claim 1 wherein both of said flange and said U-shaped channel means are made of said resilient, flexible material and both of said flange and said U-shaped channel means flex to allow said flange to pass by said interference fit at said first position to said second, engaged position.

7. The retaining arrangement of claim 1 wherein said attaching means attaches said top to said flange adjacent the first end portion of said flange.

8. The retaining arrangement of claim 1 wherein said recess is in one leg of said U-shaped channel means.

9. The retaining arrangement of claim 1 wherein said means for rotating said flange about said U-shaped channel means to said third position to mate said protuberance in said recess to lock said flange in said U-shaped channel means includes means for applying a force to said flange, said force applying means including means for supporting said flexible, resilient top on the vehicle body so that the flexible top is stretched as the flange is received in said U-shaped channel means wherein said force applying means includes said stretched, resilient top attached to said flange.

10. The retaining arrangement of claim 9 wherein said attaching means attaches said top to said flange adjacent the first end portion of said flange.

* * * * *